(12) United States Patent
Rolof

(10) Patent No.: US 11,034,009 B2
(45) Date of Patent: Jun. 15, 2021

(54) BRAKE IMPACT TOOL

(71) Applicant: Rick L. Rolof, Onoway (CA)

(72) Inventor: Rick L. Rolof, Onoway (CA)

( * ) Notice: Subject to any disclaimer, the term of this patent is extended or adjusted under 35 U.S.C. 154(b) by 218 days.

(21) Appl. No.: 16/066,602

(22) PCT Filed: Dec. 29, 2016

(86) PCT No.: PCT/CA2016/000324
§ 371 (c)(1),
(2) Date: Jun. 27, 2018

(87) PCT Pub. No.: WO2017/113005
PCT Pub. Date: Jul. 6, 2017

(65) Prior Publication Data
US 2019/0152037 A1 May 23, 2019

Related U.S. Application Data

(60) Provisional application No. 62/387,516, filed on Dec. 30, 2015.

(51) Int. Cl.
B25D 1/16 (2006.01)
B25D 1/02 (2006.01)
B60S 5/00 (2006.01)
B25B 7/04 (2006.01)

(52) U.S. Cl.
CPC ............... *B25D 1/16* (2013.01); *B25B 7/04* (2013.01); *B25D 1/02* (2013.01); *B25D 2250/111* (2013.01); *B60S 5/00* (2013.01)

(58) Field of Classification Search
CPC ...... B25D 1/16; B25D 1/02; B25D 2250/111; B25B 7/04; B60S 5/00
USPC .................................................. 81/27; 254/19
See application file for complete search history.

(56) References Cited

U.S. PATENT DOCUMENTS

| | | | | |
|---|---|---|---|---|
| 344,653 A | * | 6/1886 | Harmon | B25F 1/00 7/166 |
| 1,731,836 A | | 10/1929 | Williams | |
| 4,268,926 A | | 5/1981 | Roxton | |
| 4,466,188 A | * | 8/1984 | Svendsgaard | E04D 15/003 254/131.5 |
| 4,503,701 A | * | 3/1985 | Hardy | B21D 1/06 72/325 |
| 5,122,146 A | * | 6/1992 | Chapman | A61B 17/1717 606/102 |
| 5,934,139 A | | 8/1999 | Tucker | |
| 6,474,198 B2 | | 11/2002 | Lowther | |
| 6,705,409 B2 | | 3/2004 | Paul | |
| 6,968,989 B1 | | 11/2005 | Hall, Jr. | |
| 7,191,685 B2 | * | 3/2007 | Lowther | B21D 1/06 81/27 |
| 8,327,516 B2 | | 12/2012 | Kliskey | |

(Continued)

*Primary Examiner* — Hadi Shakeri
(74) *Attorney, Agent, or Firm* — Bennett Jones LLP

(57) ABSTRACT

A tool for impacting a frozen brake component includes an outer guide tube, an impact bar which slides within the outer guide tube and has an impact tip, which is retracted in the outer guide tube when the impact bar is retracted, and which extends beyond the guide tube when the impact bar is extended. The impact bar and the outer guide tube are curved identically and sufficiently to allow the far end of the impact bar to impact a brake component when the tool is inserted in a wheel opening.

8 Claims, 4 Drawing Sheets

(56) References Cited

U.S. PATENT DOCUMENTS

2013/0031763 A1 2/2013 Kliskey
2014/0223653 A1* 8/2014 Miller .................. E03D 9/00
                                                    4/255.01

\* cited by examiner

US 11,034,009 B2

BRAKE IMPACT TOOL

FIELD OF THE INVENTION

The present invention relates to a method and apparatus for impacting a brake component to release a frozen brake.

BACKGROUND

Frozen brakes can occur when a vehicle such as a heavy truck or heavy haul trailer is parked with the parking brake applied in below freezing temperatures when brakes are wet. The brake shoes can freeze directly to the brake drum, or brake pads can freeze directly to the brake disk, in either case causing the brakes unable to be released.

There are difficult to achieve methods currently used to release frozen brakes, most of which are unsafe. A person can crawl underneath the heavy truck or heavy haul trailer and use an open flame torch to melt the ice on the froze up brakes. It is a time consuming, slow process that can be dangerous. It can damage mechanical parts such as valve stems or can cause wheel seals to be damaged and leak oil. There is also the potential for the possibility of creating a fire. Alternatively, a person can crawl underneath the heavy truck or heavy haul trailer and use a hammer or steel bar to try to hit the frozen brake drum with enough force to make the direct contact needed to generate the required vibration to break up the ice. Because of the location and it being so difficult to make contact with, it often results in damaging mechanical parts such as brake lines, dust covers and the like. Both of these methods require being underneath the vehicle, they cannot be performed beside it.

The only one way to prevent brakes shoes from freezing onto a brake drum in the first place is to lock the brakes out when parking using supplied air from the vehicle or through a mechanical lock out. However, that can create a dangerous situation because the vehicle can roll ahead or back because the brakes have been released.

Therefore, there is a need in the art for an apparatus and method for conveniently and safely rectifying frozen brakes.

SUMMARY OF THE INVENTION

In one aspect, the invention comprises a brake impact tool comprising:

(a) an outer guide tube having a far end and a near end;

(b) an impact bar, disposed within the guide tube, configured to slide within the outer guide tube, and having a far end having an impact tip and a near end which protrudes from the guide tube;

(c) wherein the impact bar is moveable between a retracted position and an extended position wherein the impact tip impacts the far end of the guide tube or protrudes out from the guide tube;

(d) wherein either the impact bar is angled, or the outer guide tube and impact bar are identically and sufficiently curved, to allow the impact tip or the far end of the guide tube to impact a brake component when the tool is inserted in a wheel opening.

In another aspect, the invention comprises method of freeing a frozen brake by impacting a brake component, comprising the steps of:

(a) inserting a curved or angled tool comprising an outer guide tube and an inner impact bar which slides within the guide tube through a wheel opening such that a far end of the guide tube contacts the brake component;

(b) while gripping the outer guide tube, sliding the impact bar through the guide tube to contact the brake component with sufficient force to free the brake.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

In one aspect of the invention, the invention comprises a manually operated sliding impact tool configured to impact a brake component such as a brake drum, which may be sufficient to break ice buildup on frozen brakes, particularly on heavy trucks and heavy haul trailers. The brake may be frozen because of buildup of ice or foreign matter, or because of corrosion. In any case, the impact of an impact bar loosens or removes the ice, foreign matter or corrosion causing the brake component to be frozen.

Figure 1:
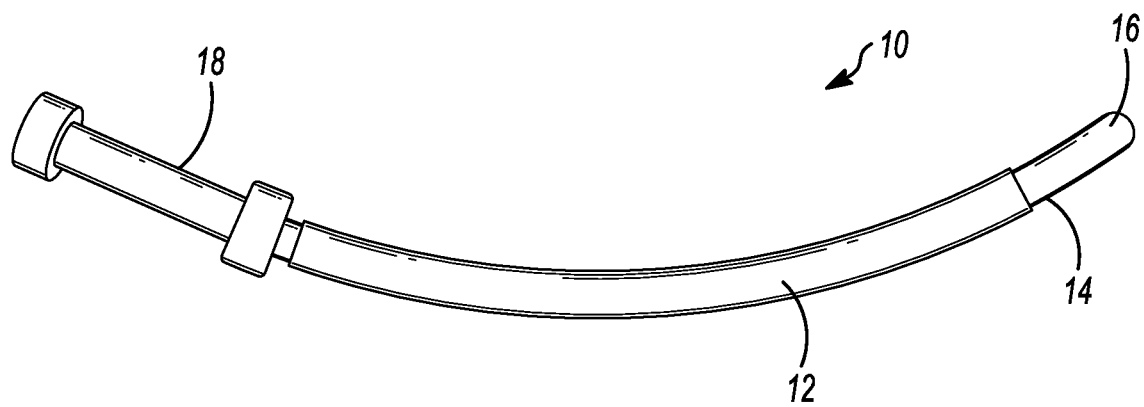
FIG. 1 shows one embodiment of the tool described herein.

As shown in FIG. 1, in one embodiment, the tool (10) comprises a curved outer guide tube (12) and a curved angled inner impact bar (14) slidingly disposed within the guide tube, which has an impact tip (16) at its far end and a handle (18) at its near end. In one embodiment, the handle is larger than the inner diameter of the outer guide tube. The handle may be a separate component and attached to the impact bar, or may be integrally formed as one part of the impact bar.

Preferably, the outer guide tube and inner impact bar are curved with identical curvatures such that the impact bar may be inserted into the outer guide tube and is able to slide within the outer guide tube, with minimal resistance. The impact bar may be slid between a retracted position and an impact position, where the impact tip protrudes out past the end of the outer guide tube, as shown in FIG. 1.

Figure 2A:
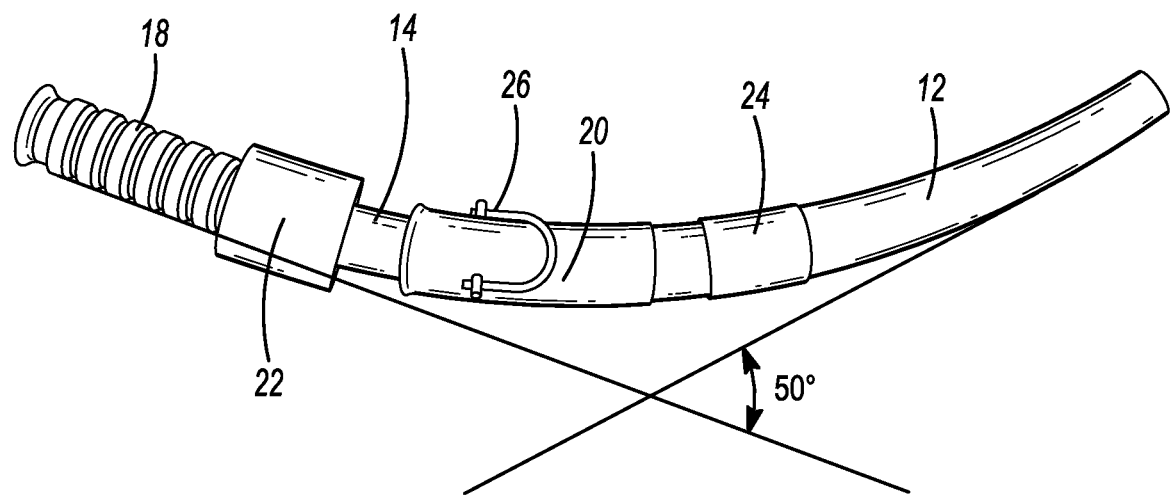
FIG. 2A shows another embodiment.

An alternative embodiment of the tool is shown in FIG. 2A. Preferably, the outer guide tube (12) also includes a grippable handle (20) along its length to facilitate handling and use. In one embodiment, the impact bar comprises a weight (22) which increases the force with which it impacts the brake drum. The weight may also have a larger diameter than the outer guide tube. Alternatively, the impact bar may be internally weighted to provide sufficient mass. A portion of the outer guide tube may have a rubber or plastic coating

(24) positioned where the guide tube would contact the wheel opening when in position, in order to minimize any damage to the wheel. A removable quick-release pin (26) may be used to prevent movement of the impact bar when the tool is not in use.

Figure 2B:
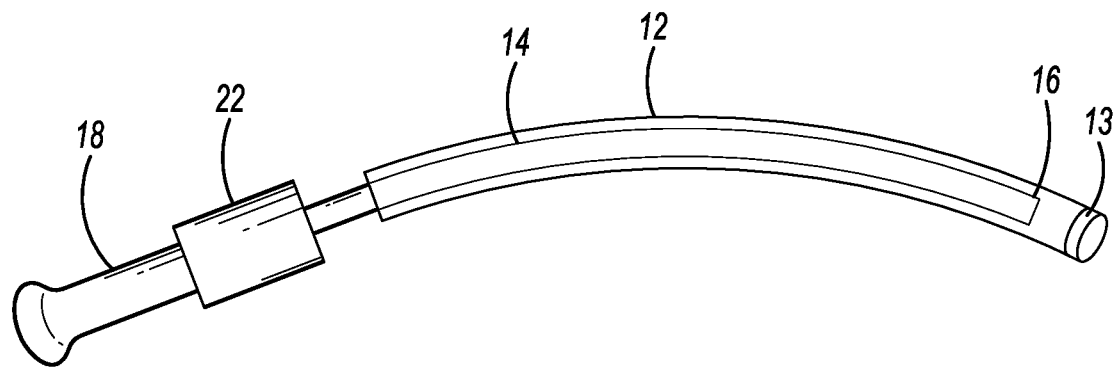
FIG. 2B shows the far end of yet another embodiment.

In an alternative embodiment, illustrated in FIG. 2B the far end of the outer guide tube may be closed, and the impact tip slides within and contacts the closed end (13), which transmits the impact force to the brake components.

Figure 3:
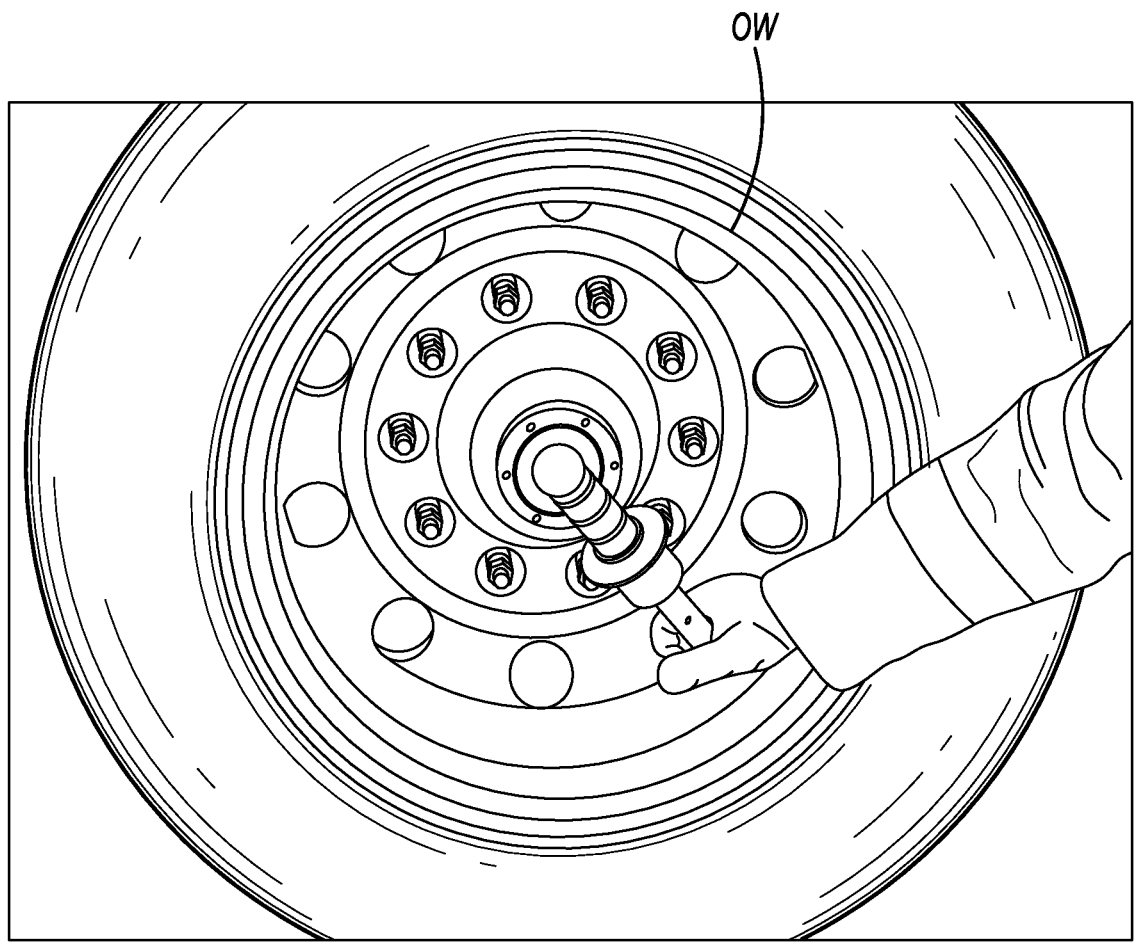
FIG. 3 shows the near end of the tool in use, after insertion into a wheel opening.
Figure 4:
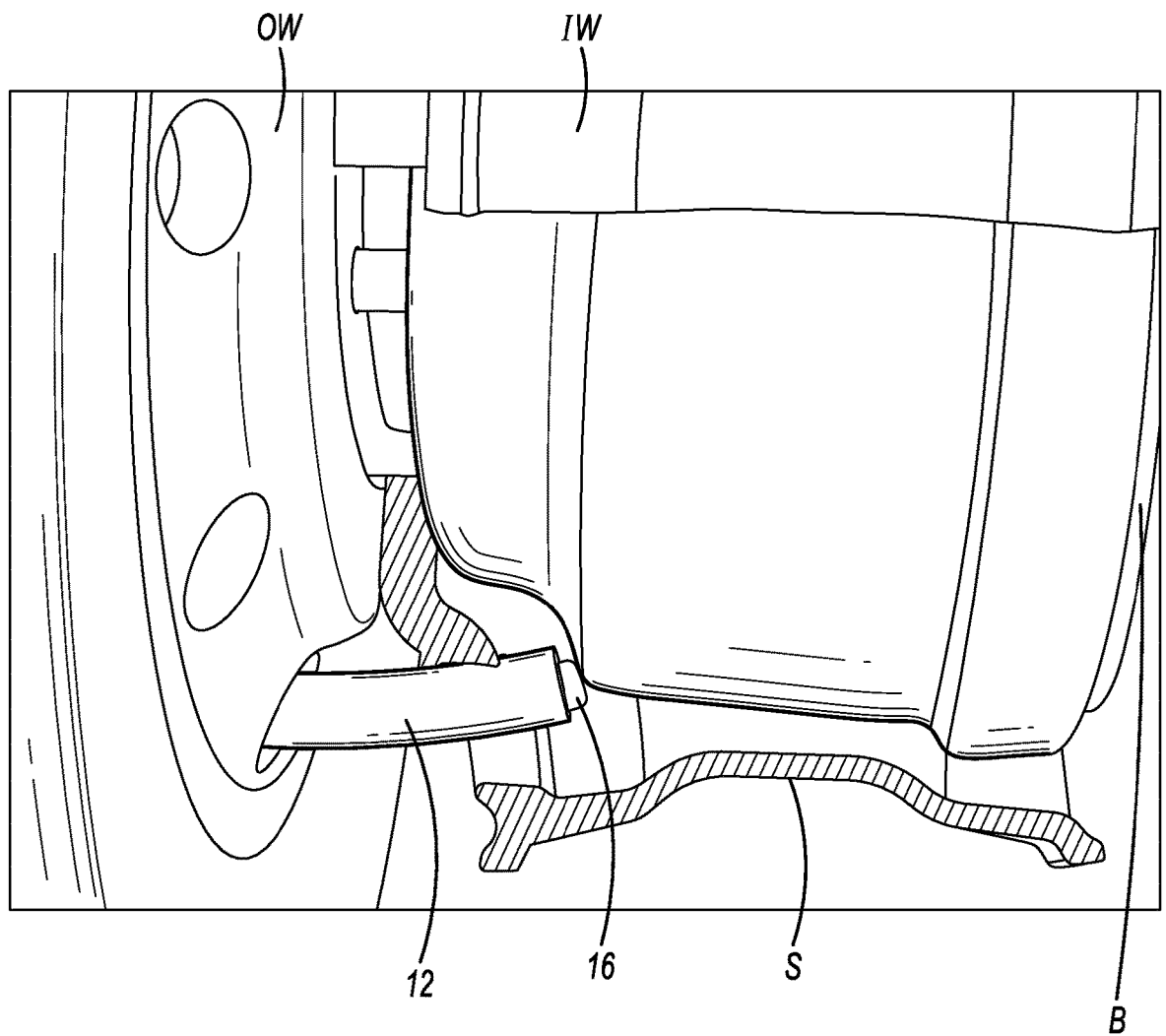
FIG. 4 shows the far end of the tool in use, showing the impact tip bearing against a brake drum, after passing through an outer wheel opening and an inner wheel opening. A portion of the inner wheel (which does not have a tire mounted on it) has been cut away to show the brake drum.

FIGS. 3 and 4 shows the tool in position for use, in a conventional heavy haul trailer axle having an outer wheel (OW) and an inner wheel (IW), where the brake drum (B) is surrounded by the inner wheel. A portion of the inner wheel is cutaway in FIG. 4 to facilitate viewing of the brake drum (B). The tool is inserted into an opening in the outer wheel and an opening in the inner wheel, until the far end of the guide tube contacts the brake drum, as shown in FIG. 4. The curvature of the tool permits its use through a wheel opening, while still permitting the impact tip to reach the brake drum, which is typically disposed behind the inner wheel (IW), inaccessible to a linear tool. The degree of curvature is not critical, so long as the tool may still reach the brake drum behind the wheel after being inserted through a wheel opening. In one embodiment, the tool is approximately 80 cm to 1 meter long, and have an approximate angle of curvature of about 45 to 55 degrees, and preferably about 50 degrees, shown in FIG. 2.

After the tool is in position, the impact bar may then be retracted, and then forcefully moved to its extended position until the impact tip contacts the brake drum or the closed end of the guide tube. In either case, the momentum of the impact bar causes a force to be transmitted to the brake drum, which may be sufficient to release the brake drum by breaking up ice buildup, or otherwise dislodging foreign material.

Figure 5:
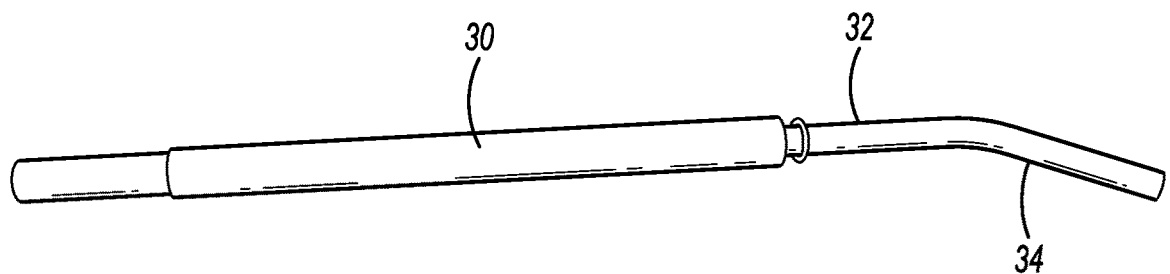
FIG. 5 shows an alternative embodiment, with an angled tip and a straight outer guide tube.

An alternative embodiment is shown in FIG. 5, where the impact bar (32) has an angled end (34). The angle allows the tool to be inserted through the wheel opening, and the angled end of the impact bar to reach the brake component, even where the outer guide tube (30) is substantially straight.

The impact tip may be rounded so as not to damage the brake drum on impact, but still convey sufficient force to the brake drum to unfreeze the brake components upon impact. In one embodiment, the tip may be replaceable, such as by being a threaded component which attaches to the far end of the impact bar. In one embodiment, the tip may be comprised of a non-sparking material, such as brass or a plastic, so as to prevent sparking in flammable environments, or a softer material to prevent damage on less robust brake components, such as disk brakes. Thus, the tool may be provided with two or more replaceable tips made of different materials for different purposes.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

What is claimed is:

1. A method of releasing a frozen brake by impacting a brake component, comprising the steps of:
    (a) providing a curved tool comprising an outer guide tube and an inner impact bar disposed within the outer guide tube and which slides within the outer guide tube between a retracted position and an extended position, the impact bar having a far end having an impact tip and a near end which protrudes from the guide tube, wherein the outer guide tube and impact bar are identically and sufficiently curved, to allow the impact tip or the far end of the guide tube to impact a brake component;
    (b) inserting the curved tool through a wheel opening such that the far end of the guide tube contacts the brake component; and
    (c) while gripping the outer guide tube, sliding the impact bar through the guide tube to contact the brake component with sufficient force to release the brake.

2. The method of claim 1 wherein the impact bar comprises a weight which increases the force of impact.

3. The method of claim 1 wherein the impact tip is replaceable and comprises steel, brass or a plastic.

4. The method of claim 1 wherein the near end of the impact bar comprises a handle, and the outer guide tube comprises a handle along its length.

5. The method of claim 1 wherein the tool has a degree of curvature between about 45 degrees and 55 degrees.

6. The method of claim 5 wherein the degree of curvature is about 50 degrees.

7. The method of claim 1 wherein the far end of the guide tube is closed, and the impact tip impacts the closed end when the impact bar is in the extended position.

8. The method of claim 1 wherein the far end of the guide tube is open, and the impact tip protrudes from the guide tube when the impact bar is in the extended position.

\* \* \* \* \*